Nov. 25, 1958   R. H. BAKER   2,861,470
VARIABLE CAM
Filed April 13, 1955
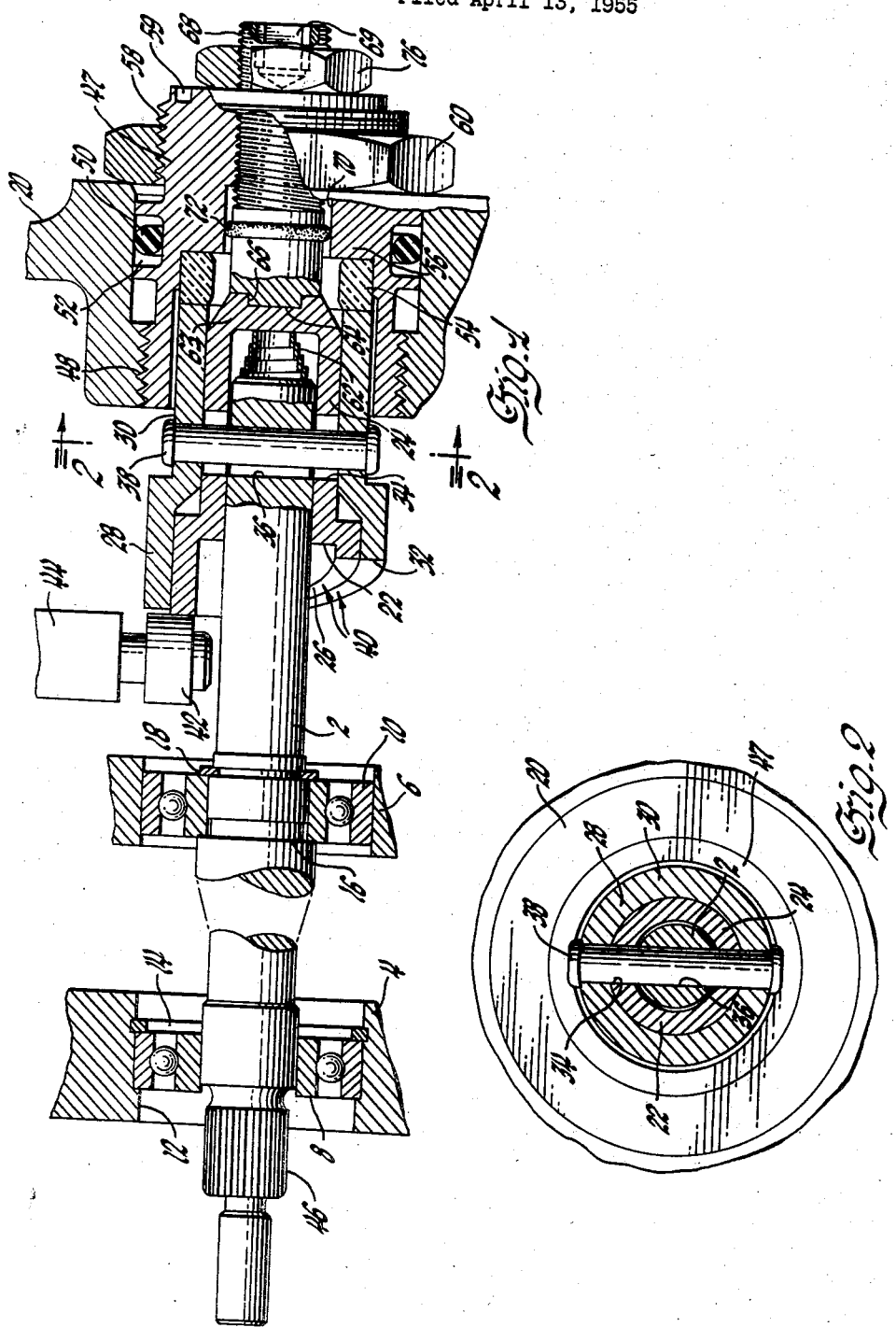
INVENTOR
Ray H. Baker
BY
Paul Fitzpatrick
ATTORNEY

United States Patent Office 2,861,470
Patented Nov. 25, 1958

2,861,470

VARIABLE CAM

Ray H. Baker, Indianapolis, Ind., assignor to General Motors Corporation, Detroit, Mich., a corporation of Delaware Application April 13, 1955, Serial No. 501,135

4 Claims. (Cl. 74—568)

This invention relates to an adjustable cam mechanism and more particularly to an adjustable cam mechanism having a continuous cam surface defined by a number of cams adjustable with respect to each other.

The present invention provides an adjustable cam mechanism suitable for use in a number of installations where it is desirable to have a variable continuous cam operating or actuating surface.

One particular use of this cam mechanism is in the fuel flow control of a gas turbine engine. The cam mechanism adjusts the fuel flow according to a fixed schedule as the power lever or throttle is moved through its selection range. However, each engine has different operating characteristics, so that a particular schedule may be suitable for one engine and unsuitable for another engine. The adjustable cam mechanism of this invention provides flexibility in the fuel flow adjustment pattern so that the schedule can be varied according to the operating characteristics of the individual engine. Thus, the schedule can be varied at one or more desired points in the throttle selection range, such as the idling point, without changing the remainder of the schedule.

The primary object of this invention is to provide a continuous cam surface defined by a number of cams adjustable with respect to each other.

This and other objects of this invention will be readily apparent from the following specification and drawings, in which:

Figure 1 is a sectional view of a portion of a turbine fuel control embodying a cam mechanism according to this invention; and Figure 2 is a transverse sectional view on the plane indicated by line 2—2 of Figure 1.

Referring now to Figure 1 of the drawings, a shaft 2 is rotatably supported within housing portions 4 and 6 by bearings 8 and 10. The outer race of bearing 8 is located by circular shoulder 12 of housing portion 4 and retained in place by split ring 14. The inner race of bearing 10 is located by circular shoulder 16 of shaft 2 and retained in place by split ring 18 fitting within a cylindrical groove in the shaft. Housing portions 4 and 6 and housing portion 20 are all part of the same housing, but only those portions of the housing necessary to the description of this invention have been shown.

A cam 22 having a sleeve portion 24 and a cam surface 26 is slidably mounted on shaft 2. Another cam 28 having a sleeve portion 30 and a cam surface 32 is slidably mounted on cam 22 so that the cams are mounted coaxially on the shaft in telescopic relationship. The sleeve portion 24 of cam 22 is provided with an axially elongated diametrical slot 34, and a similar axially elongated diametrical slot 36 is formed in shaft 2. A pin 38 fixed to sleeve portion 30 of cam 28 extends through the elongated slots in the shaft and cam 22.

Referring now to Figure 2, it can be seen that the width of the slots is equal to the diameter of the pin, so that the circumferential relationship between the cam sleeves and the shaft remains fixed at all times. However, cam 28 is slidable with respect to cam 22 and the shaft, and likewise cam 22 is slidable with respect to both cam 28 and the shaft. The cam surfaces 26 and 32 of the cams form a continuous cam actuating or operating surface 40 which is variable by axially adjusting either cam 22 or 28 with respect to the other cam. The variable continuous cam surface 40 actuates a cam follower 42 fixed to a movable member 44 which controls the throttle valve opening.

Shaft 2 includes a splined portion 46 on which is mounted an arm of the power lever linkage (not shown) to interconnect the shaft and the power control lever. As the power control lever is moved through its power selection range by the operator to set the fuel flow to the engine, shaft 2 and cams 22 and 28 are rotated, and the set fuel flow to the engine is adjusted according to a fixed schedule by the continuous cam surface 40 actuating cam follower 42. If a single cam were used, the set fuel flow to each engine would be adjusted according to the same fixed schedule, regardless of the individual operating characteristics of the particular engine. However, each particular engine has individual operating characteristics and it is desirable that the schedule of fuel flow adjustment be variable to best suit the needs of the particular engine. As already described, each of the cams 22 and 28 is adjustable with respect to the other cam axially of shaft 2 so that the continuous cam surface 40 can be varied. Thus, if it is desirable to adjust the fixed schedule in the idle range, a portion of cam surface 26 can be substituted for cam surface 32 by axially adjusting either of the cams. Each of the cams can be adjusted to set the fixed schedule of adjustment best suited to the needs of the particular engine.

Cam 28 is adjusted as follows: A bushing 47 has a threaded portion 48 cooperating with a similar threaded portion in housing portion 20 to locate the bushing within the housing. An O-ring seal 50 fitting within an annular groove 52 of the bushing provides a seal between the bushing and the housing. An anti-friction washer 54 fits between the sleeve portion 30 of cam 28 and the base 56 of bushing 47 to adjust the cam axially as the bushing is threaded into and out of the housing. The bushing includes a threaded shank portion 58 of reduced diameter and a number of spanner holes 59 for a spanner wrench to adjust the bushing. A lock nut 60 fitting on the threaded shank portion 58 and bearing against housing 20 retains the bushing in place after the bushing and cam have been adjusted.

Cam 22 is adjusted as follows: A conical coil spring 62 bears against the end of shaft 2 and the base 63 of sleeve portion 24 of cam 22 to bias the cam within the housing. The base 63 is provided with a circular recess 64, and a circular boss 66 on the end of a threaded stud 68 fits within the recess. The threaded stud 68 fits within a partially threaded bore 70 in bushing 47, an O-ring seal 72 being provided between the stud and the bore. The position of cam 22 is adjusted by threading stud 68 into and out of bore 70, with a lock nut 76 bearing against bushing 47 being used to retain the stud in place after the stud and cam have been adjusted. Stud 68 includes an Allen wrench socket 69 to provide for adjustment of the stud.

As will be apparent, cam 28 is adjusted relative to the housing and shaft 2, and cam 22 is adjusted relative to cam 28. By a suitable combination of adjustments, both cams may be adjusted to any combination of positions axially of the shaft within the range permitted by the structure.

Thus, this invention provides a cam mechanism having a continuous cam surface formed by a number of cams adjustable with respect to each other.

Although a specific embodiment of this invention has been shown and described, various changes and modifications may be made within the scope and spirit of the invention.

I claim:

1. An adjustable cam mechanism comprising, in combination, a first annular member having an axially facing cam surface, a second annular member located in telescopic relationship with said first annular member and having an axially facing cam surface disposed in radially adjacent relationship to said cam surface of said first annular member whereby said cam surfaces form a continuous cam surface having portions thereof defined by each of said cam surfaces, a pin secured to one of said members and projecting diametrically with respect thereto, axially extending slot means in the other of said annular members for receiving said pin and having an axial length greater than the diameter of said pin whereby said members are interconnected for conjoint rotational movement thereof but are axially adjustable with respect to each other, and means for axially adjusting each of said annular members with respect to the other annular member to adjust the axial position of the cam surface of the annular member being adjusted with respect to the cam surface of the other annular member to thereby vary said continuous cam surface by varying that portion of the continuous cam surface defined by the cam surface of the member being adjusted.

2. An adjustable cam mechanism comprising, in combination, a shaft, a first annular member slidably mounted on said shaft and having an axially facing cam surface, a second annular member slidably mounted on said shaft in telescopic relationship with said first annular member and having an axially facing cam surface disposed in radially adjacent relationship to said cam surface of said first annular member whereby said cam surfaces form a continuous cam surface having portions thereof defined by each of said cam surfaces, elongated slot means in said shaft and in the radially inner annular member, pin means supported by the radially outer annular member and extending through said slot means, the width of said slot means being substantially equal to the width of said pin means whereby said members are interconnected for conjoint rotational movement and the length of said slot means being greater than the width of said pin means whereby each of said annular members is axially adjustable with respect to the other annular member, and means for axially adjusting each of said annular members with respect to the other annular member to adjust the axial position of the cam surface of the member being adjusted with respect to the cam surface of the other annular member to thereby vary said continuous cam surface by varying that portion of the continuous cam surface defined by the cam surface of the member being adjusted.

3. An adjustable cam mechanism comprising, in combination, a shaft, a first annular member slidably mounted on said shaft and having an axially facing cam surface, a second annular member slidably mounted on said shaft in telescopic relationship with said first annular member and having an axially facing cam surface disposed in radially adjacent relationship to said cam surface of said first annular member whereby each of said cam surfaces forms a continuous cam surface having portions thereof defined by each of said cam surfaces, a housing, each of said annular members having a sleeve portion fitting within said housing, means within said housing bearing against the sleeve portions of each of said annular members and adjusting the axial position of each annular member with respect to the other annular member to adjust the axial position of the cam surface of the one annular member being adjusted with respect to the cam surface of the other annular member to thereby vary said continuous cam surface by varying that portion of the continuous cam surface defined by the cam surface of the member being adjusted, and means fixing the angular relationship of said members with respect to each other.

4. An adjustable cam mechanism comprising, in combination, a first annular member having an axially facing cam surface, a second annular member located in telescopic relationship with said first annular member and having an axially facing cam surface disposed in radially adjacent relationship to said cam surface of said first annular member whereby said cam surfaces form a continuous cam surface, said continuous cam surface having a total operative surface divided into a first section defined by an operative portion of one of said cam surfaces and a second section defined by an operative portion of the other of said cam surfaces, a shaft for supporting said annular members, means fixing the angular relationship of said members with respect to each other and to said shaft for conjoint rotational movement thereof, means for varying the proportion of the total cam surface formed by said first section and said second section, said last mentioned means including means for axially adjusting one of said annular members with respect to the other annular member and to said shaft to adjust the axial position of the cam surface of said one annular member with respect to the cam surface of the other annular member to vary the sizes of the operative portions of said cam surfaces and thereby vary the proportions of the total surface formed by each of said sections.

References Cited in the file of this patent

UNITED STATES PATENTS

| | | |
|---|---|---|
| 64,922 | Strickland | May 21, 1867 |
| 1,331,746 | Evenson | Feb. 24, 1920 |
| 1,336,803 | Woerner | Apr. 13, 1920 |
| 1,460,651 | Hall | July 3, 1923 |
| 1,506,851 | Martin et al. | Sept. 2, 1924 |
| 2,107,079 | Mentele | Feb. 1, 1938 |
| 2,167,921 | Watson | Aug. 1, 1939 |
| 2,216,318 | Lewis | Oct. 1, 1940 |
| 2,445,902 | Bell | July 27, 1948 |
| 2,591,650 | Williams | Apr. 1, 1952 |
| 2,617,900 | Morrison | Nov. 11, 1952 |
| 2,618,764 | Rieber | Nov. 18, 1952 |